(12) United States Patent
Field et al.

(10) Patent No.: US 6,986,124 B1
(45) Date of Patent: Jan. 10, 2006

(54) DEBUGGER PROTOCOL GENERATOR

(75) Inventors: Robert G. Field, Santa Cruz, CA (US); Gordon Hirsch, Sunnyvale, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/540,576

(22) Filed: Mar. 31, 2000

Related U.S. Application Data

(60) Provisional application No. 60/145,136, filed on Jul. 21, 1999.

(51) Int. Cl.
G06F 9/44 (2006.01)
G06F 15/16 (2006.01)

(52) U.S. Cl. .............................. 717/124; 709/230

(58) Field of Classification Search ................ 717/124, 717/117, 118, 148; 714/38
See application file for complete search history.

(56) References Cited

U.S. PATENT DOCUMENTS

| | | | |
|---|---|---|---|
| 5,303,379 A | | 4/1994 | Khoyi et al. |
| 5,499,343 A | | 3/1996 | Pettus |
| 5,729,682 A | | 3/1998 | Marquis et al. |
| 5,787,245 A | * | 7/1998 | You et al. ...................... 714/38 |
| 5,794,046 A | * | 8/1998 | Meier et al. ................. 717/128 |
| 5,815,653 A | * | 9/1998 | You et al. .................... 717/134 |
| 5,901,315 A | * | 5/1999 | Edwards et al. ............. 717/124 |
| 6,058,393 A | * | 5/2000 | Meier et al. ................. 717/124 |
| 6,158,045 A | * | 12/2000 | You ............................ 717/124 |
| 6,324,683 B1 | * | 11/2001 | Fuh et al. .................... 717/124 |

FOREIGN PATENT DOCUMENTS

| | | | |
|---|---|---|---|
| EP | 1071016 A2 | * | 1/2001 |
| JP | 2001101011 A | * | 4/2001 |

OTHER PUBLICATIONS

Birds of a Feather, '98 JavaOne conference schedule, [online] 1998 [retrieved on Jul. 11, 2002], Retrieved from the Internet <URL: http://java.sun.com/javaone/javaone98/bof-s.html>.*

Birds-of-a-Feather Information: The Java Platform Debugger Architecture, '99 JavaOne conference schedule, [online] 1999 [retrieved on Jul. 12, 2002], Retrieved from the Internet <URL: http://industry.java.sun.com/javaone/99/event/0,1768, 1022,00.html>.*

Plymire, Al, Thread: Debugger Comments from SUN, Message 1606126, [online] Feb. 26, 1999 [retrieved on Jul. 11, 2002], Retrieved from the Internet <URL: http://www.geocrawler.com/archives/3/294/1999/2/0/1606126/>.*

Plymire, Al, Thread: Debugger Comments from SUN, Message 1606127, [online] Feb. 27, 1999 [retrieved on Jul. 11, 2002], Retrieved from the Internet <URL: http://www.geocrawler.com/archives/3/294/1999/2/0/1606127/>.*

(Continued)

*Primary Examiner*—Tuan Dam
*Assistant Examiner*—Eric B. Kiss
(74) *Attorney, Agent, or Firm*—Beyer Weaver & Thomas, LLP

(57) ABSTRACT

A method for automatically generating front-end code and back-end code that are both compatible with a specification, such as the JDWP communication protocol. First, a detailed protocol specification is written that contains a description of a communication protocol between the front-end code and the back-end code. The detailed specification is then input into a code generator that parses the specification. The front-end code is then automatically generated from the formal specification, and may be written in a first computer language such as the Java™ programming language. The code generator then generates the back-end code, which may be written in a second computer language such as C.

10 Claims, 5 Drawing Sheets

OTHER PUBLICATIONS

"HTTP-NG Binary Wire Protocol," Jul. 1998, W3C Working Draft, pp. 1-20.*

"JSR 14: Add Generic Types To The Java™ Programming Language", online [accessed Sep. 9, 2003], Retrieved from Internet <URL: http://jcp.org/en/jsr/detail?id=14&showPrint>, pp. 1-5.*

Alfred V. Aho, et al., "Compilers, Principles, Techniques, and Tools," Addisson-Wesley, pp. i, ii, vii-x, 1-24.*

"Microsoft Press Computer User's Dictionary," 1998, Microsoft Press, pp. i, ii, 325.*

"Java News from Dec., 1998," [online] Accessed May 21, 2004, Retrieved from Internet <URL: http://www.ibiblio.org/javafaq/1998december.html>, pp. 1-9.*

"Java News from Mar., 1999," [online] Accessed May 25, 2004, Retrieved from Internet <URL: http://www.ibiblio.org/javafaq/1999march.html>, pp. 1-8.*

"Java News from May, 1998," [online] Accessed May 25, 2004, Retrieved from Internet <URL: http://www.ibiblio.org/javafaq/1998may.html>, pp. 1-7.*

"Java Pages: History of Changes," [online] Accessed May 21, 2004, Retrieved from Internet <URL: http://www.htabi.bfh.ch/Resources/Computing/SunGroup/Java/History>, pp. 1-3.*

"java-security@sun.com archives—May 1998 (#162)," May 1998 [online] Accessed May 21, 2004, Retrieved from Internet <URL: http://archives.java.sun.com/cgi-bin/wa?A2=ind9805&L=java-security&F=&S=&P=16758>, pp. 1-6.*

Kane Scarlett, "News and New Product Briefs (Jan. 5, 1999)," [online] Accessed May 25, 2004, Retrieved from Internet <URL: http://www.javaworld.com/javaworld/jw-01-1999/jw-01-newsbriefs2_p.html>, pp. 1-13.*

JavaOne 1998 Presentation, Robert Field and Gordon Hirsch, http://java.sun.com/people/rfield/slides/tools/jbug/overview.htm.

JavaOne 1999 Presentation, Robert Field and Gordon Hirsch.

Devanbu et al., "Generating Testing and Analysis Tools with Aria", Jan. 1996, ACM Transactions on Software Engineering and Methodology, vol. 5, No. 1, pp. 42-62.

Premkumar T. Devanbu, "A Customizable, Language- and Front-End independent Code Analyzer," Proceedings of the Fourteenth International Conference on Software Engineering., 1992., pp. 307-317.

Lisa Friendly, "The Design of Distributed Hyperlinked Programming Documentation," IWHD 1995 Conference Proceedings, Jun. 2, 1995, 25 pages.

* cited by examiner

DEBUGGER PROTOCOL GENERATOR

This application claims priority from U.S. Provisional Application No. 60/145,136, entitled "JAVA PLATFORM DEBUGGER ARCHITECTURE," filed Jul. 21, 1999; and is related to U.S. patent application Ser. No. 09/540,575, entitled "EXTENDABLE JAVA DEBUGGER CONNECTION MECHANISM," filed Mar. 31, 2000; the disclosures of which are herein incorporated by reference.

BACKGROUND OF THE INVENTION

1. Field of the Invention

The present invention relates generally to the field of computer software, and more particularly to protocol generating software for generating software components from a formal specification.

2. Description of the Problem to be Solved

The Java™ Debug Wire Protocol (JDWP) (Java™ and related marks are trademarks of Sun Microsystems, Inc.) is a protocol for communicating between a debugger application and a Java Virtual Machine (target VM). By implementing the JDWP, a debugger can either work in a different process on the same computer, or on a remote computer. Since Java™ programming applications may be implemented across a wide variety of different hardware platforms and operating systems, the JDWP facilitates remote debugging across a multi-platform system. In contrast, many prior art debugging systems are designed to run on a single platform and must generally debug only applications running on the same or similar platform.

Typically, a debugger application is written in the Java programming language and the target side is written in native code. In a reference implementation of JDWP, a front-end debugger component is written in Java and a back-end reference implementation for the target VM is written in C. Both pieces of code need to be compliant with a detailed protocol specification, or the reference system will fail. What is needed is some mechanism to assure that both the front-end and back-end code portions are truly compatible with the protocol specification and with each other.

Languages exist for the specification of inter-process/object communication, such as the Interface Definition Language (IDL) which is part of the Common Object Request Broker Architecture (CORBA), developed by the Object Management Group (OMG). These languages are compiled (i.e. by an IDL compiler) to produce stubs for the client side of communication and skeletons for the server side. However, such languages are not directed to the problems associated with generating protocol compliant debugger code.

Therefore, it would be desirable to have a method for generating both the front-end code and the back-end code for a debugger directly from a detailed specification.

SUMMARY OF THE INVENTION

The present invention provides a method for automatically generating front-end code and back-end code that are both compatible with an interface specification, such as the JDWP communications protocol. First, a detailed protocol specification is written that contains a description of a communications protocol between the front-end and the back-end. The detailed specification is then input into a code generator that parses the specification. The front-end code is then automatically generated from the formal specification, and may be written in a first computer language such as the Java programming language. The code generator then generates the back-end code, which may be written in a second computer language such as C.

The present invention may further generate HTML code containing a human-readable description of the protocol specification.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a method for assuring compatibility between a front-end debugger program running on a first virtual machine and a back-end debugger agent program running on a second virtual machine, wherein a communications protocol between the front-end program and the back-end program is defined by a formal specification.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

Figure 1:
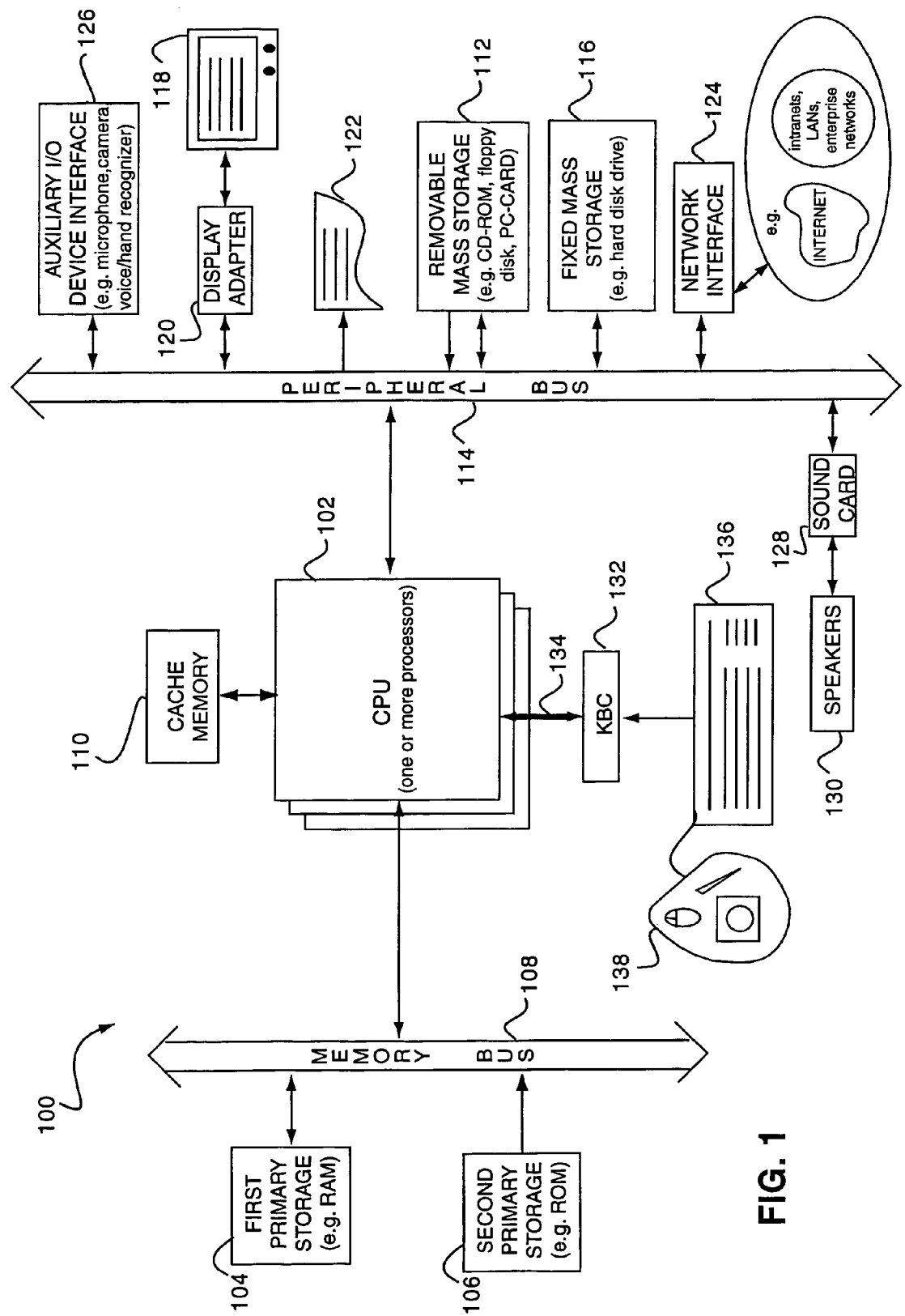
FIG. 1 is a block diagram of a computer system suitable for implementing the present invention.

FIG. 1 is a block diagram of a general purpose computer system 100 suitable for carrying out the processing in accordance with one embodiment of the present invention. FIG. 1 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. It should be noted that in re-configurable computing systems, CPU 102 can be distributed amongst a group of programmable logic devices. In such a system, the programmable logic devices can be reconfigured as needed to control the operation of computer system 100. In this way, the manipulation of input data is distributed amongst the group of programmable logic devices. CPU 102 is a general purpose digital processor which controls the operation of the computer system 100. Using instructions retrieved from memory, the CPU 102 controls the reception and manipulation of input data, and the output and display of data on output devices.

CPU 102 is coupled bi-directionally with a first primary storage 104, typically a random access memory (RAM), and uni-directionally with a second primary storage area 106, typically a read-only memory (ROM), via a memory bus 108. As is well known in the art, primary storage 104 can be used as a general storage area and as scratch-pad memory, and can also be used to store input data and processed data. It can also store programming instructions and data, in the form of data objects, in addition to other data and instructions for processes operating on CPU 102, and is used typically used for fast transfer of data and instructions in a bi-directional manner over the memory bus 108. Also as well known in the art, primary storage 106 typically includes basic operating instructions, program code, data and objects used by the CPU 102 to perform its functions. Primary storage devices 104 and 106 may include any suitable computer-readable storage media, described below, depending on whether, for example, data access needs to be bi-directional or uni-directional. CPU 102 can also directly and very rapidly retrieve and store frequently needed data in a cache memory 110.

A removable mass storage device 112 provides additional data storage capacity for the computer system 100, and is coupled either bi-directionally or uni-directionally to CPU 102 via a peripheral bus 114. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 116 also provides additional data storage capacity and is coupled bi-directionally to CPU 102 via peripheral bus 114. The most common example of mass storage 116 is a hard disk drive. Generally, access to these media is slower than access to primary storages 104 and 106.

Mass storage 112 and 116 generally store additional programming instructions, data, and the like that typically are not in active use by the CPU 102. It will be appreciated that the information retained within mass storage 112 and 116 may be incorporated, if needed, in standard fashion as part of primary storage 104 (e.g. RAM) as virtual memory.

In addition to providing CPU 102 access to storage subsystems, the peripheral bus 114 is used to provide access other subsystems and devices as well. In the described embodiment, these include a display monitor 118 and adapter 120, a printer device 122, a network interface 124, an auxiliary input/output device interface 126, a sound card 128 and speakers 130, and other subsystems as needed.

The network interface 124 allows CPU 102 to be coupled to another computer, computer network, or telecommunications network using a network connection as shown. Through the network interface 124, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 124.

Auxiliary I/O device interface 126 represents general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 102 is a keyboard controller 132 via a local bus 134 for receiving input from a keyboard 136 or a pointer device 138, and sending decoded symbols from the keyboard 136 or pointer device 138 to the CPU 102. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 108, peripheral bus 114, and local bus 134 are illustrative of any interconnection scheme serving to link the subsystems. For example, a local bus could be used to connect the CPU to fixed mass storage 116 and display adapter 120. The computer system shown in FIG. 1 is but an example of a computer system suitable for use with the invention. Other computer architectures having different configurations of subsystems may also be utilized.

Figure 2A:
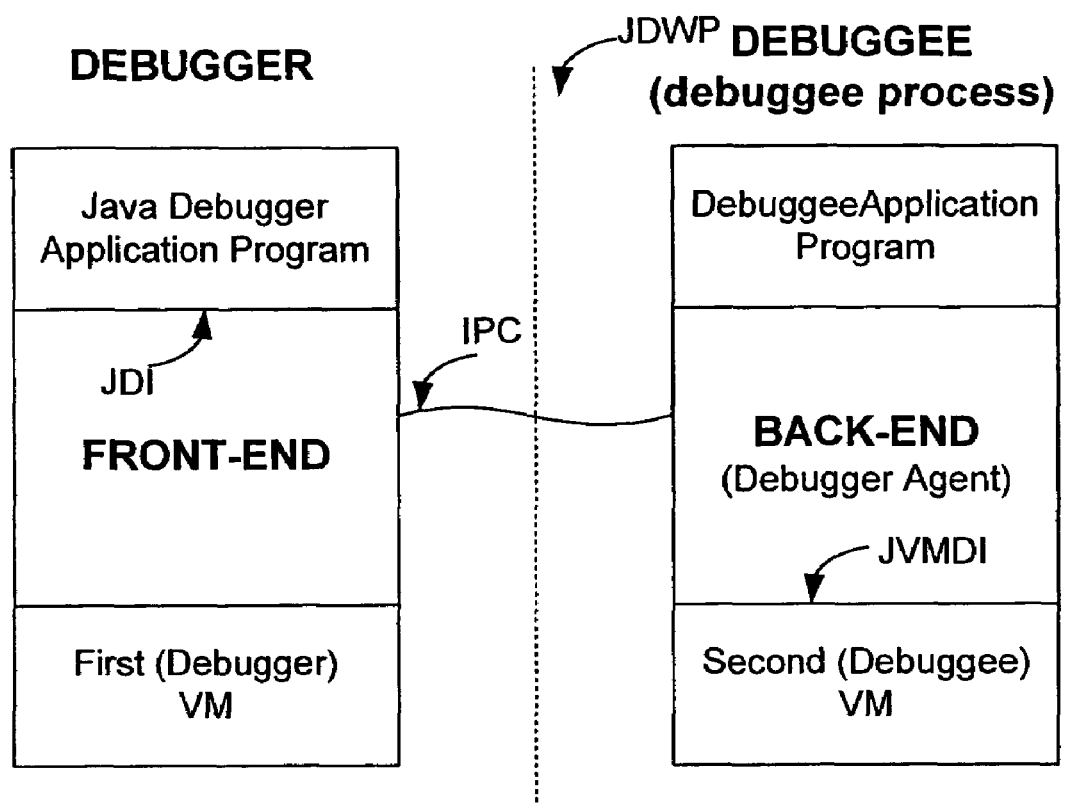
FIG. 2a is a diagram illustrating the Java Platform Debugger Architecture.

In a described embodiment of the present invention, the invention is generally applicable to and described in terms of computer systems implementing a Java Platform based distributed architecture. However, as will be seen in the following description, the concepts and methodologies of the present invention should not be construed to be limited to a Java Platform based distributed architecture. Such an architecture is used only to describe a preferred embodiment. A distributed Java platform implementation may have many different types of hardware, operating systems, and even Java Virtual Machines (VMs). Therefore it may be necessary to debug a program running on a remote system, having completely different architecture. Also, in many instances it is preferable to actually load a main debugger program on a separate computer system so that the target system can be debugged in a state as close to possible to its "original" state. As shown in FIG. 2a, the Java Platform Debugger Architecture (JPDA) supports local and remote debugging by defining three separate interfaces. The Java Platform Debugger Architecture defines a set of interfaces used in the creation of debugger applications. It consists of the Java Debug Interface (JDI), the Java Debug Wire Protocol (JDWP), and the Java Virtual Machine Debug Interface (JVMDI). The JPDA provides a solution to the general connection problems encountered by debugger applications.

In the described embodiment, on a first computer system (debugger), a Java debugger application program runs on a first (debugger) Java Virtual Machine (VM). A Java VM suitable for use in the described embodiment of the present invention is shown and described in FIG. 4 below. The debugger has a front-end component (hereinafter "front-end") that implements a high-level Java Debug Interface (JDI). The Java debugger application program, which provides a user interface, is a client of the JDI. The debuggee (or debuggee process) is the process that is being debugged, and it consists of the application being debugged (debuggee application program), a second (debuggee) Java Virtual Machine (VM) running the application, and a "back-end" debugger agent (hereinafter "back-end"). The back-end is responsible for communicating requests from the debugger front-end to the debuggee (second) VM and for communicating the response to the requests back to the front-end. The back-end communicates with the front-end over a communications channel using the Java Debug Wire Protocol (JDWP). The back-end communicates with the debuggee VM using the Java Virtual Machine Debug Interface (JVMDI).

Figure 2B:
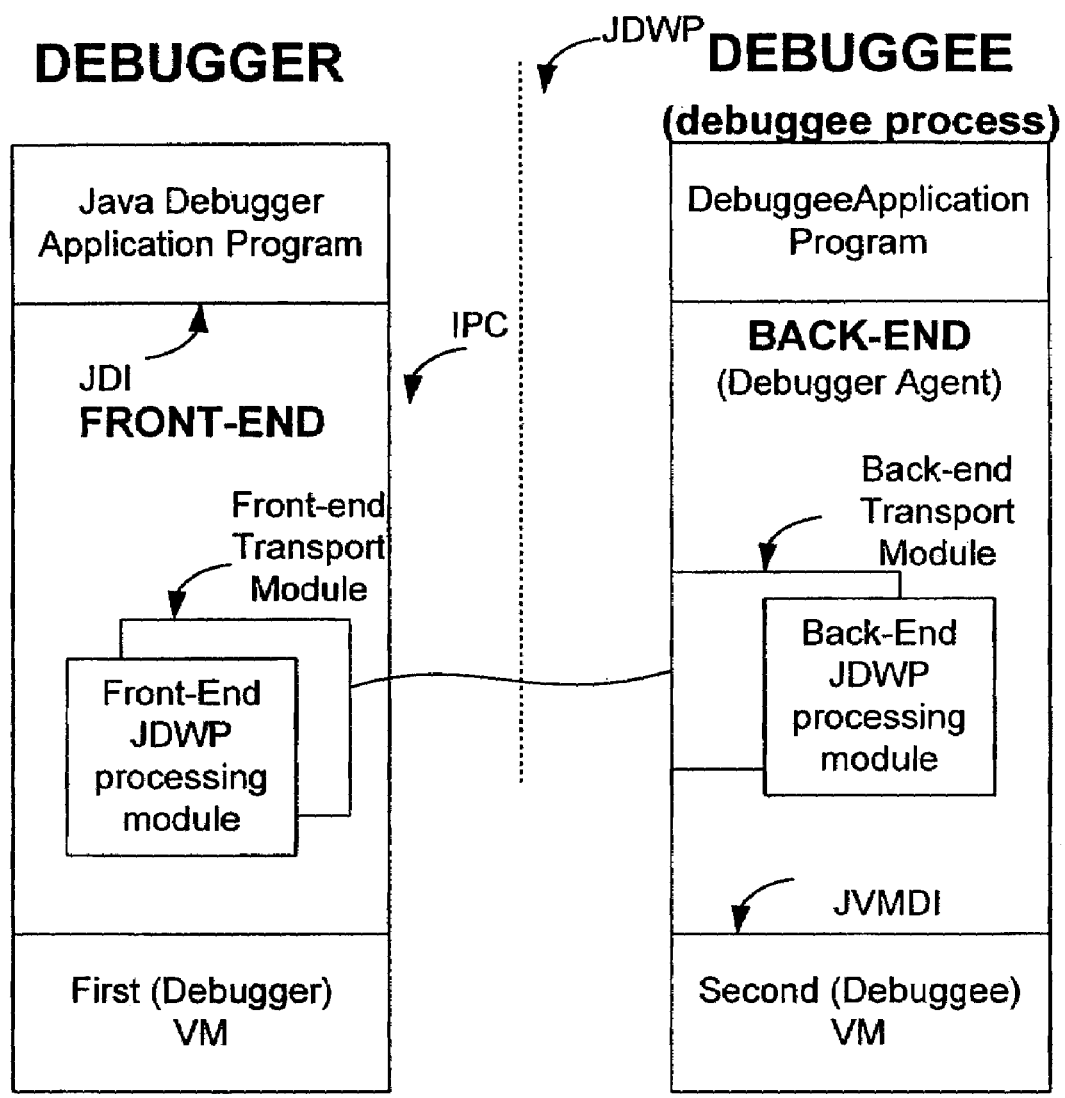
FIG. 2b is a diagram illustrating the Java Platform Debugger Architecture showing JDWP processing modules of the present invention.

FIG. 2b is similar to FIG. 2a but shows two additional components needed to enable the present invention plus transport modules. The two additional logical components are a front-end JDWP processing module and a back-end JDWP processing module. One of the goals of the debugger protocol generator of the present invention is to generate front-end and back-end JDWP processing modules. The logical components shown in FIG. 2b are basic components for which vendors can provide their own implementations. The front-end and back-end transport modules implement a transport mechanism, such as shared memory, socket, or serial line.

Thus, as is shown in FIGS. 2a and 2b, the Java Platform Debugger Architecture provides three separate and distinct interfaces for debugging. Third-party vendors can choose which interface level best suits their needs and write a debugger application accordingly. Specifically, the JDI is a 100% Java platform interface implemented by the front-end, which defines information and requests at a high level. For vendors who wish to concentrate on a graphical user interface for the JDPA, they only need to use this level.

The JVMDI interface is a native code interface implemented by the debuggee VM. It defines the services that a VM must provide for debugging and includes requests for information, actions, and notifications. Specifying the VM interface for a debugger allows any VM implementation to plug into the JPDA. The back-end may be written in non-native code, but experience has shown that debugger support code running sharing the same VM services as the debuggee can cause deadlocks and other undesired behavior.

The JDWP defines the format of information and requests transferred between the front-end and the back-end. It does not specify the transport mechanism used to physically transmit the formatted information, that is, the form of inter-process communication (IPC) is not specified. Different transport mechanisms may be used such as sockets, serial line, shared memory, etc. The specification of the communication protocol allows the debuggee and the debugger front-end to run under separate VM implementations and/or on separate platforms. Also, by defining an intermediate interface, the front-end may be written in a language other than the Java language, or the back-end in non-native code (i.e. Java language code). Note that due to the use of distributed interfaces, a VM vendor that does not wish to adhere to the JVMDI interface can still provide access via the JDWP.

By defining three separate interfaces, the Java Platform Debugger Architecture, JPDA overcomes many limitations associated with prior art debugger systems. The present invention addresses the problem of documenting the interface and of managing compatibility across multiple platforms and programming languages at the JDWP level. Because the JDI and JVMDI layers are conventional programming interfaces, the compatibility and documentation problems are less severe and more amenable to existing tools.

The compatibility and documentation problems are solved by generating compatible code and documentation from a single specification source. More specifically, this involves generating a front-end JDWP processing module (which becomes part of the front-end implementation in the Java language), a back-end JDWP processing module (which will become part of the back-end implementation in the C language), and HTML documentation of the protocol specification.

The tasks performed by the generated front-end JDWP processing module can be placed generally in two categories. One category relates to events generated in the debuggee VM, which must be sent to the front-end through the back-end. The front-end JDWP processing module: 1) reads and parses JDWP formatted events from the back-end; 2) converts the events into JDI events; and 3) queues the events. The other category relates to requests made through the JDI by the debugger application. The front-end JDWP processing module: 1) writes JDWP formatted requests to the wire, sending them to the back-end; 2) associates the appropriate reply to the request; 3) reads and parses the reply; and 4) delivers the reply to the requestor. The back-end JDWP processing module must handle the other end of the communication, so it too has two categories of processing. For event processing, the back-end JDWP processing module writes the event (which was generated through the JVMDI) to the wire, sending it to the front-end. For requesting processing, the back-end JDWP processing module: 1) reads and parses JDWP formatted requests from the front-end; 2) forwards the request to other back-end code, which will generate a reply; 3) writes the reply to the wire, sending it to the front-end.

Without a mechanically assured consistency between the JDWP specification, documentation and implementation code, it is unlikely that the Java Platform Debugger Architecture could evolve into a workable multi-vendor strategy. Thus, the present invention enforces a formal specification of the interface and thereby aids its evolution. The related art has not been designed to solve this problem in that it does not generate debugger implementation code and is not streamlined to the problems of debuggers.

Figure 3:
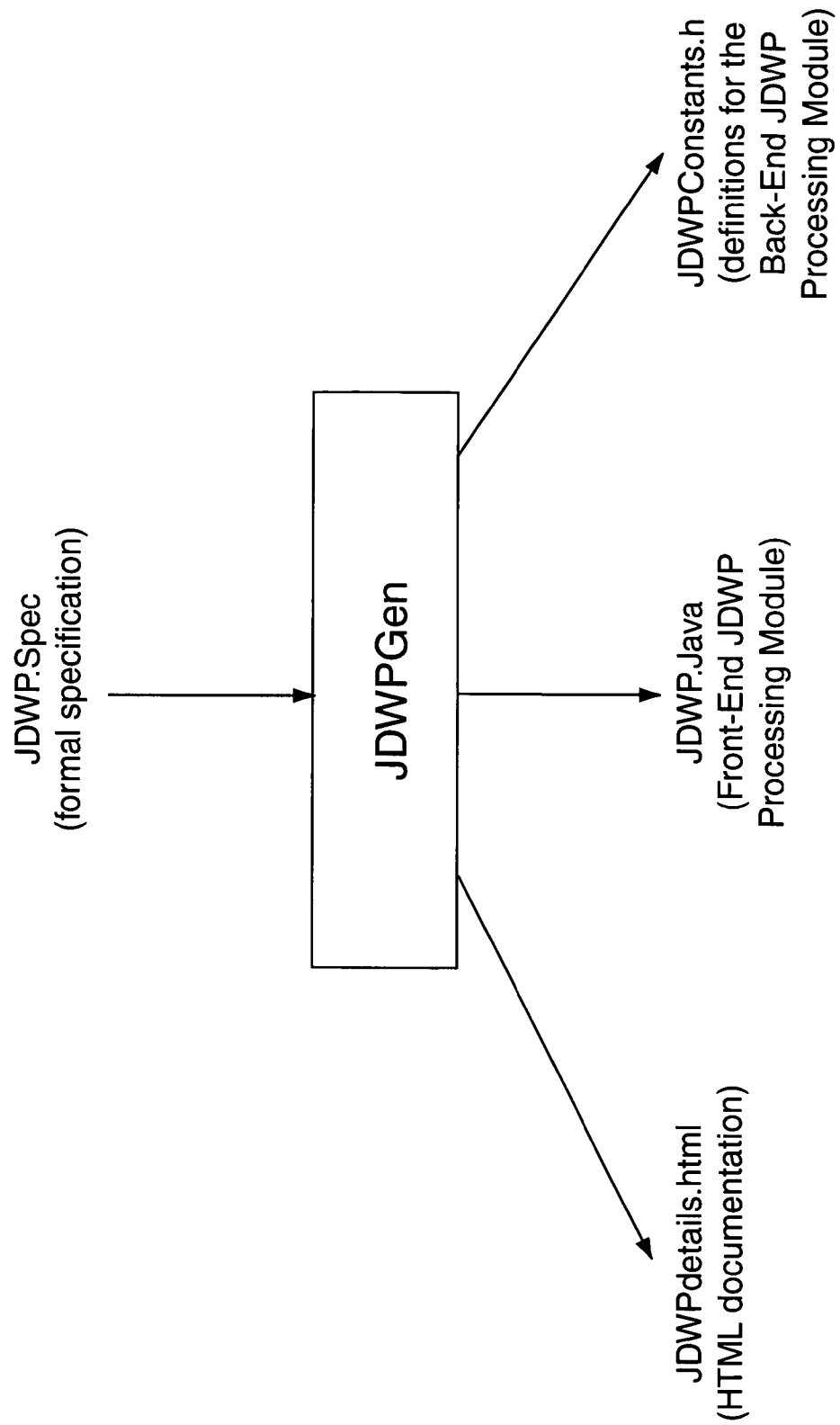
FIG. 3 is a diagram illustrating the input and outputs of the debugger protocol generator of the present invention.

As shown in FIG. 3, a JDWPGen program parses a formal specification of the JDWP (JDWP.spec), and from the specification generates: 1) the protocol documentation (JDWPdetails.html), the front-end JDWP processing module (JDWPjava), and a C language "include" file (JDWPConstants.h) which controls the behavior of the back-end JDWP processing module (which is presently manually written). Since both the JDWPjava and JDWPConstants.h are generated from the same specification, it is much easier to "debug" the debugger code, and to produce new versions of the JDWP without having to re-write two separate programs.

In one embodiment of the present invention, a specification language is defined so that the JDWP specification can be precisely interpreted by JDWPGen. This purely declarative language is the JDWP specification language, and is described below. The syntax of the JDWP specification language primarily consists of parenthesized statements with the general form: open parenthesis, statement type, argument list and close parenthesis. The argument list often consists of statements. The exact nesting these statements may have is highly constrained and is defined precisely by the following grammar for the JDWP specification language:

```
SPECIFICATION
    NAME COMMENT SETLIST
SETLIST
    SET
    SETLIST SET
SET
    (CommandSet NAMEVALUE COMMANDLIST)
    (ConstantSet NAME CONSTANTLIST)
COMMANDLIST
    COMMAND
    COMMANDLIST COMMAND
COMMAND
    (Command NAMEVALUE COMMENT COMMANDBODY)
COMMANDBODY
    (Out STRUCTURE) (Reply STRUCTURE)
    (Event STRUCTURE)
STRUCTURE
    ELEMENT
STRUCTURE ELEMENT
ELEMENT
    (DATATYPE NAME COMMENT)
    (Group NAME STRUCTURE)
    (Repeat NAME COMMENT ELEMENT)
    (Select NAME SELECTOR ALTLIST)
SELECTOR
    (INTEGRALDATATYPE NAME COMMENT)
ALTLIST
    ALT
    ALTLIST ALT
ALT
    (Alt NAMEVALUE COMMENT STRUCTURE)
DATATYPE
    INTEGRALDATATYPE
    boolean
    object
    threadObject
    threadGroupObject
    arrayObject
    stringObject
    classLoaderObject
    classObject
    referenceType
    referenceTypeID
    classType
    interfaceType
    arraytype
    method
    field
    frame
    string
    value
    location
    tagged-object
    referenceTypeID
    typed-sequence
    untagged-value
INTEGRALDATATYPE
    int
    long
    byte
CONSTANTLIST
    CONSTANT
    CONSTANTLIST CONSTANT
CONSTANT
    (Constant NAMEVALUE COMMENT)
NAMEVALUE
    NAME=NUMBER
    NAME=NAME
```

The symbols in all capital letters are non-terminals and all other symbols are terminals. Non-terminals are defined within the grammar except for the following:
NAME a sequence of letters
NUMBER a sequence of digits
COMMENT arbitrary text within double quotes or nothing Semantics of Specification Language A request command specifies a request for information made by the front-end where the Out section exactly specifies the format of the data that makes up the request and the Reply section exactly specifies the format of the data that will be returned by the back-end. An event command exactly specifies the format of data in an event emanating from the back-end. Constants specify specific values for use within commands.

In the present embodiment, JDWPGen employs a recursive descent parser to parse the JDWP specification, which is written in the JDWP specification language. Other parsing techniques could be used as well, such as a generated LALR(1) parser. The parser constructs an abstract syntax tree representation of the specification. Each node in the tree is an object that encapsulates the actions needed to generate the outputs for that node. The nodes correspond directly with statements in the input specification. All further processing is accomplished by "walking" this abstract syntax tree. Several passes are used to resolve names and check for errors. Finally, the tree is walked three more times to generate the outputs: once to generate the Java class which is used by the front-end to send and receive information across JDWP; once to generate the C include file containing the definitions used by the back-end to send and receive information across JDWP; and once to generate the published human-readable specification document in HTML.

Figure 4:
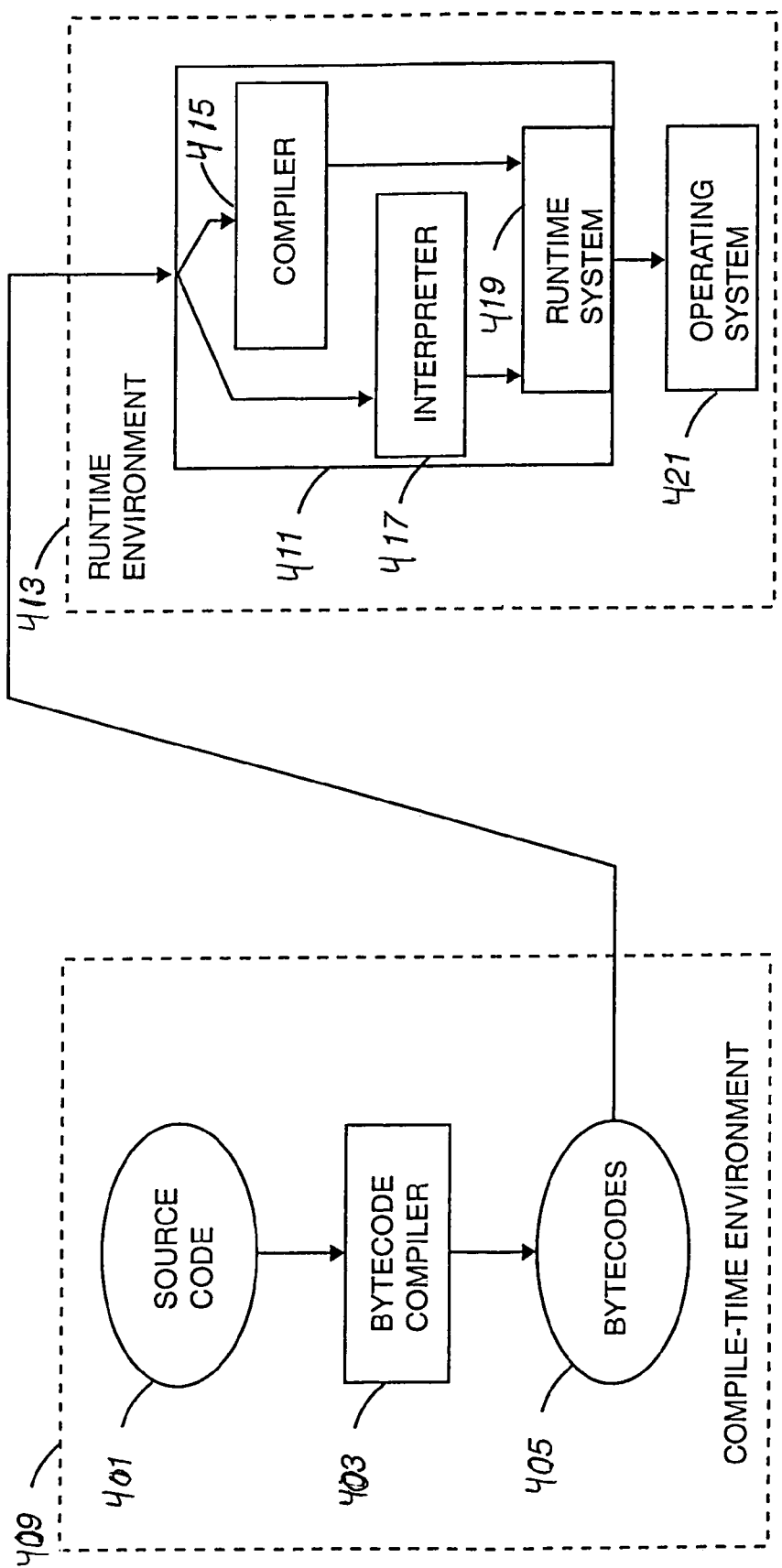
FIG. 4 is diagram of a Java Virtual Machine suitable for use in one implementation of the present invention.

FIG. 4 is a diagrammatic representation of a virtual machine, such as a JVM, that can be supported by computer system 100 of FIG. 1 described above. Source code 401 is provided to a bytecode compiler 403 within a compile-time environment 409. Bytecode compiler 403 translates source code 401 into bytecodes 405. In general, source code 401 is translated into bytecodes 405 at the time source code 401 is created by a software developer.

Bytecodes 405 can generally be reproduced, downloaded, or otherwise distributed through a network, e.g., through network interface 124 of FIG. 1, or stored on a storage device such as primary storage 104 of FIG. 1. In the described embodiment, bytecodes 405 are platform independent. That is, bytecodes 405 may be executed on substantially any computer system that is running a suitable virtual machine. Native instructions formed by compiling bytecodes may be retained for later use by the JVM. In this way the cost of the translation are amortized over multiple executions to provide a speed advantage for native code over interpreted code. By way of example, in a Java™ environment, bytecodes 405 can be executed on a computer system that is running a JVM.

Bytecodes 405 are provided to a runtime environment 413 which includes a virtual machine 411. Runtime environment 413 can generally be executed using a processor such as CPU 102 of FIG. 1 Virtual machine 411 includes a compiler 415, an interpreter 417, and a runtime system 419. Bytecodes 405 can generally be provided either to compiler 415 or interpreter 417.

When bytecodes 405 are provided to compiler 415, methods contained in bytecodes 405 are compiled into native machine instructions (not shown). On the other hand, when bytecodes 405 are provided to interpreter 417, bytecodes 405 are read into interpreter 417 one bytecode at a time. Interpreter 417 then performs the operation defined by each bytecode as each bytecode is read into interpreter 417. In general, interpreter 417 processes bytecodes 405 and performs operations associated with bytecodes 405 substantially continuously.

When a method is called from an operating system 421, if it is determined that the method is to be invoked as an interpreted method, runtime system 419 can obtain the method from interpreter 417. If, on the other hand, it is determined that the method is to be invoked as a compiled method, runtime system 419 activates compiler 415. Compiler 415 then generates native machine instructions from bytecodes 405, and executes the machine-language instructions. In general, the machine-language instructions are discarded when virtual machine 411 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference in its entirety.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of providing a debugging environment in a computing environment that includes first and second virtual machines, the method comprising:

inputting a formal specification written in a debugging specification language into a program code generator, the formal specification defining a high level debugging communication protocol for communication between the first and second virtual machines;

parsing the formal specification using the program code generator;

automatically generating a front-end debugger program portion from the formal specification based on the parsing of the formal specification, the front-end debugger program running on a first virtual machine, the front-end debugger program portion corresponding to a platform independent programming language which provides a high level debugging interface which can be accessed by a debugger application operating on a first virtual machine;

automatically generating a back-end debugger program code portion from the formal specification based on the parsing of the formal specification, the back-end debugger program code portion implementing a virtual machine debugging interface which provides the capability to control and communicate with a second virtual machine, the back-end debugger program code portion corresponding to a platform-specific programming language; and wherein the front-end debugger program portion and the back-end debugger program code that are generated from the formal specification are compatible with each other and comply with the formal specification, thereby implementing the high-level communication protocol between the first and second virtual machines.

2. A method as recited in claim 1, wherein the front-end processing module operates to send events that are generated in the second virtual machine to the front-end debugger program portion via the back-end debugger program code portion.

3. A method as recited in claim 2, wherein the front-end processing module performs one or more of the following operations:

read and parse events from the back-end debugger code portion;

convert the events from a first format into a second format which is compatible with the front end debugger code portion; and queue the events.

4. A method as recited in claim 2, wherein the front-end processing module further performs operations related to requests made through the front-end debugger program by the debugger application program.

5. A method as recited in claim 2, wherein the front-end processing module further performs one or more of the following operations:

write formatted requests;

send the formatted requests to the back-end debugger code portion;

associate at least one reply with the formatted requests;

read and parse the at least one reply;

deliver the at least one reply to an appropriate requester.

6. A method as recited in claim 5, wherein the back-end processing module performs operations related to event processing and request processing.

7. A method as recited in claim 6, wherein the event processing operations performed by the back-end processing module includes sending an event which was generated through the virtual machine debugging interface to the front-end debugging portion.

8. A method as recited in claim 7, wherein the request processing operations performed by the back-end processing module include one or more of the following operations:

reading and parsing formatted requests from the front-end debugger program portion;

forwarding the requests to the back-end debugger program code portion;

sending the reply to the requests to the front-end debugger program portion.

9. A method as recited in claim 1, wherein the back-end processing module performs operations related to event processing and request processing.

10. A method as recited in claim 1, wherein the front-end debugger program portion includes a class which is used by the front-end debugger program portion to send and receive information over the debugging communication protocol.

* * * * *